No. 784,527. PATENTED MAR. 7, 1905.
C. J. VERNON.
PROCESS OF PEELING FRUIT.
APPLICATION FILED NOV. 22, 1902.
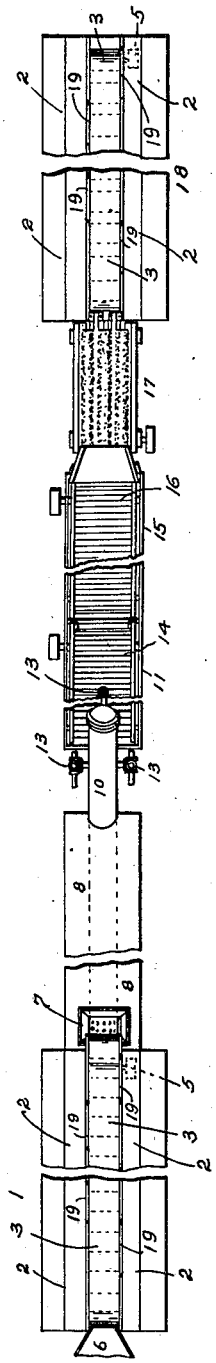
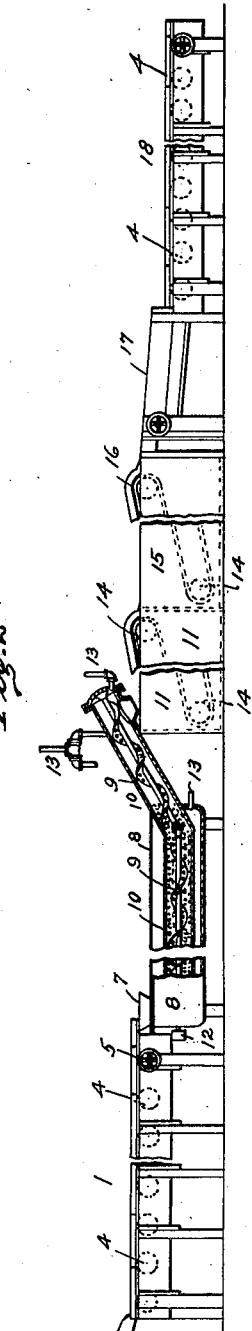

No. 784,527. Patented March 7, 1905.

UNITED STATES PATENT OFFICE.

CHARLES J. VERNON, OF FRESNO, CALIFORNIA.

PROCESS OF PEELING FRUIT.

SPECIFICATION forming part of Letters Patent No. 784,527, dated March 7, 1905.

Application filed November 22, 1902. Serial No. 132,492.

*To all whom it may concern:*

Be it known that I, CHARLES J. VERNON, a citizen of the United States, residing at Fresno, in the county of Fresno and State of California, have invented certain new and useful Improvements in Processes of Peeling Fruit; and I do hereby declare the following to be a full, clear, and exact description of the invention, such as will enable others skilled in the art to which it appertains to make and use the same.

This invention relates to the method or process of removing the outer covering or peel from fruits; and some of the objects of the invention are to provide such a process or method which is simple in application and efficient for the purpose intended.

It is also an object of this invention to provide a process for removing the outer covering or peel from fruit without injuring the fruit and without producing any deleterious effect to the consumer, as well as to produce a better article than can be done by the means now employed for this purpose.

With these and other objects in view the invention consists in the method or process substantially as more fully described in the following specification, in which the steps of the process or method are described in detail, in connection with the drawings accompanying and forming part of this application, wherein there is illustrated one form of apparatus capable of employment in carrying out this process or method, and in which—

Figure 1 illustrates a top plan view of an apparatus which may be employed in carrying out this process or method; and Fig. 2 is a side elevational view of the same, partly broken away.

This process or method relates to the removal of the outer covering or peel from fruit or other articles; and it consists, essentially, in cutting and pitting the fruit, conveying the same within a closed heated receptacle, progressing the fruit through a solution of caustic soda in said receptacle, then discharging the fruit into a solution containing alum, then immersing the treated fruit into cold water, thence discharging the fruit upon a brushing-machine, thence into cold water, from which the fruit emerges in condition for transportation to the place of deposit or otherwise.

Referring now to the drawings, illustrating an apparatus which may be employed to carry out this process or method of peeling fruit, the reference character 1 designates a conveyer-table, embodying lateral liquid chambers or receptacles 2 and an intermediate endless conveyer 3, carried by rollers 4, mounted in the frame of the conveyer-table, the shaft of one whereof is extended and carries a band wheel or pulley 5, by means of which the conveyer may be actuated through the mediation of any suitable driving mechanism. (Not shown.)

The fruit is first cut in halves and pitted by any suitable machine, from which it is deposited upon a hopper or chute 6, that directs the same upon the endless conveyer 3 or directly upon the conveyer 3, to be discharged into a hopper 7 or closed receptacle 8, having a screw-conveyer 9 operating within a perforated cylinder or jacket 10, and said screw-conveyer is constructed to progress the fruit positively and at a predetermined speed through the solution or liquid in the closed receptacle 8 and discharge the partially-treated fruit from said receptacle into another receptacle 11, as hereinafter more fully explained. The screw-conveyer 9 may be actuated by means of a band-wheel 12, driven by any actuating mechanism, and the closed receptacle 8 may be heated by steam or other media through connections 13, as will be readily understood. The liquid within the closed receptacle 8 is made by using about one-half a pound of seventy-six per cent. of caustic soda to each gallon of water used, and the fruit is immersed in this solution or liquid for about twenty seconds, being conveyed through such solution or liquid by means of the screw-conveyer 9 before mentioned, and from the closed receptacle 8 the fruit is dropped into the receptacle 11, preferably containing a solution made by dissolving two pounds of alum in about twenty-five gallons of water, and through the latter solution or liquid the fruit is progressed by a conveyer-belt 14, which discharges the partially-treated fruit into a tank or receptacle 15, containing cold water and provided with an endless conveyer-belt 16, constructed to discharge the fruit upon a brushing-machine 17, where any particles of the outer covering or peel are removed from the fruit and from which the thoroughly-peeled fruit is discharged upon another conveyer-table 18, to be conveyed to the place of canning or drying the fruit, as the case may be, or the gates 19 of the conveyer-table may be opened and the fruit may be discharged into the lateral liquid receptacles on each side of the endless conveyer 3 thereof, as will be readily understood.

By means of this process or method the fruit is first halved and pitted, then discharged into a solution containing caustic soda, then conveyed into a solution containing alum, after which the fruit is discharged into cold water and is finally brushed, when the fruit is ready for canning or drying purposes.

By the employment of this process the fruit is rapidly handled, all of the covering is removed from the fruit, and a bright product is produced which is more wholesome and palatable than a fruit now on the market.

This invention is in no manner limited to use with the apparatus herein shown and described, as this process or method can be carried out or practiced with other apparatus than that shown and the amount of materials herein mentioned may be slightly varied without departing from the spirit and scope of this invention.

I claim—

1. The herein-described process or method of peeling fruit, which consists in halving and pitting the fruit, then subjecting the fruit to the action of a skin-disintegrating solution, then subjecting the partially-treated fruit to the action of the solution containing alum and finally removing the particles of skin from the treated fruit.

2. The herein-described process or method of peeling fruit which consists in first cutting up and pitting the fruit, then subjecting the same to the action of a heated solution containing caustic soda, then subjecting the partially-treated fruits to the action of a solution containing alum and finally brushing the fruit.

3. The herein-described process or method of peeling fruit which consists in pitting and cutting up the fruit, then subjecting the cut-up fruit to the action of a solution containing caustic soda, then immersing the fruit in a solution of alum, then rinsing the fruit in cold water and finally brushing the fruit.

4. The herein-described process or method of peeling fruit which consists in pitting and dividing the fruit, then subjecting the divided fruit to the action of a solution of caustic soda in a heated receptacle, then immersing the fruit in an alum solution, then rinsing the fruit in cold water and finally brushing the fruit.

5. The herein-described process or method of peeling fruit, which consists in dividing and pitting the fruit, then subjecting the fruit to the action of a skin-disintegrating solution, then subjecting the partially-treated fruit to the action of a solution containing alum and finally brushing the treated fruit.

6. The herein-described process or method of peeling fruit which consists in subjecting the fruit to a skin-disintegrating solution, then introducing the fruit into an astringent solution, then rinsing the fruit in cold water and finally removing the particles of skin from the fruit.

7. The herein-described process or method of peeling fruit, which consists in dividing or pitting the fruit, then subjecting the fruit to the action of the skin-disintegrating solution, then introducing the fruit into an astringent solution, and finally rinsing the fruit.

In testimony whereof I have signed my name to this specification, in the presence of two subscribing witnesses, at Fresno, in the county of Fresno and State of California, this 11th day of November, 1902.

CHARLES J. VERNON.

Witnesses:
 HENRY WILDER,
 E. F. LAMBERT.